United States Patent Office 2,978,453
Patented Apr. 4, 1961

2,978,453

3,3,5,5-TETRANITROPIPERIDINE

Milton B. Frankel, Pasadena, Calif., assignor to Aerojet-General Corporation, Azusa, Calif., a corporation of Ohio No Drawing. Filed Dec. 12, 1956, Ser. No. 628,949

17 Claims. (Cl. 260—293)

This invention relates to a new series of nitropiperidine nitroalkyl compositions and their preparation.

This application is a continuation-in-part of my application Serial No. 392,474, filed November 16, 1953, now abandoned.

In particular, it relates to the nitropiperidine nitroalkyl compounds having the general formula:

$$\begin{array}{c} NO_2\diagdown\diagup NO_2 \\ C-CH_2 \quad NO_2 \\ H_2C \diagup \quad \diagdown N-A-C-R \\ \diagdown C-CH_2 \quad NO_2 \\ NO_2 \diagup \diagdown NO_2 \end{array}$$

wherein A is an alkylene radical and R is a nitroalkyl, alkyl, nitro or hydrogen radical.

These compounds are conveniently prepared and are excellent high explosives, and can be used in any conventional explosive missile, projectile, rocket, or the like, as the main explosive charge. An example of such a missile is disclosed in United States Patent No. 2,470,162, issued May 17, 1949. One way of using the high explosives of this invention in a device such as that disclosed in United States Patent No. 2,470,162, is to pack the crystalline explosive in powder form into the warhead of the missile. Alternatively, the crystals can be first pelletized and then packed. A charge thus prepared is sufficiently insensitive to withstand the shock entailed in the ejection of a shell from a gun barrel or from a rocket launching tube under the pressure developed from ignition of a propellant charge, and can be caused to explode on operation of an impact- or time fuse-mechanism firing a detonating explosive such as lead azide or mercury fulminate.

The new nitropiperidine compounds of my invention are prepared by condensing 2,2,4,4-tetranitro-1,5-pentanediol with a nitro amine, in accordance with the following general reaction scheme:

$$\begin{array}{c} NO_2 \quad NO_2 \quad NO_2 \\ HO-CH_2-C-CH_2-C-CH_2-OH + R-C-A-NH_2 \longrightarrow \\ NO_2 \quad NO_2 \quad NO_2 \end{array}$$

$$\begin{array}{c} NO_2\diagdown\diagup NO_2 \\ C-CH_2 \quad NO_2 \\ H_2C \diagup \quad \diagdown N-A-C-R \\ \diagdown C-CH_2 \quad NO_2 \\ NO_2 \diagup \diagdown NO_2 \end{array}$$

wherein A is an alkylene radical and R is a nitroalkyl, alkyl, nitro or hydrogen radical.

It is generally preferred in this reaction to generate the amine in situ from a strong mineral acid salt by neutralizing the salt with an alkali or alkaline earth metal base.

Alternatively, some of the new compositions of my invention are prepared by condensing a nitro alcohol having an activated hydroxyl group with tetranitropiperidine, in accordance with the following general reaction scheme:

$$\begin{array}{c} NO_2\diagdown\diagup NO_2 \\ C-CH_2 \quad NO_2 \\ H_2C \diagup \quad \diagdown NH + HO-CH_2-C-R \longrightarrow \\ \diagdown C-CH_2 \quad NO_2 \\ NO_2 \diagup \diagdown NO_2 \end{array}$$

$$\begin{array}{c} NO_2\diagdown\diagup NO_2 \\ C-CH_2 \quad NO_2 \\ H_2C \diagup \quad \diagdown N-CH_2-C-R \\ \diagdown C-CH_2 \quad NO_2 \\ NO_2 \diagup \diagdown NO_2 \end{array}$$

wherein R is a nitroalkyl, alkyl, nitro or hydrogen radical.

This reaction is essentially a Mannich type condensation and it has been determined that any alcohol having a hydroxyl group separated from a dinitro-substituted carbon radical by no more than one methylene group will react in accordance with the reaction scheme set forth above. This results from the fact that the hydroxy radical in such compounds is activated by the geminal dinitro grouping.

It will be appreciated that this alternative synthesis is limited to the preparation of compositions wherein the geminal dinitro grouping is separated from the nitrogen of the piperidine radical by a methylene radical.

In both of the above reactions, temperature is not critical, although it is preferred to conduct the reaction at below room temperature in order to provide more effective control.

The following examples are provided for purposes of illustration and are not intended to in any way define the limits of the invention.

EXAMPLE I

*Preparation of N-(2,2,2-trinitroethyl)-3,3,5,5-tetranitropiperidine*

A solution of 0.3 gm. of trinitroethanol, 0.3 gm. of 3,3,5,5-tetranitropiperidine, and 15 ml. of methanol was refluxed for six hours. The solution was concentrated in vacuo giving 0.45 gm. of a cream colored solid. Two recrystallizations from benzene gave white crystals, M.P. 163–168° C., I.S.=20 cm./2 kg.

*Analysis.*—Calc'd. for $C_7H_8N_8O_{14}$: Percent C, 19.63; percent H, 1.88; percent N, 26.17. Found: Percent C, 19.80; percent H, 1.79; percent N, 25.88.

EXAMPLE II

*Preparation of N-(3,3,3-trinitropropyl)-3,3,5,5-tetranitropiperidine*

A mixture of 4.6 gm. (0.02 ml.) of 3,3,3-trinitropropyl amine hydrochloride, 5.68 gm. (0.02 ml.) of 2,2,4,4-tetranitro-1,5-pentanediol, and 60 ml. of 1.136 N sodium hydroxide (0.02 ml.) was added from a burette, causing a cream-colored solid to precipitate. The mixture was stirred for 30 minutes and cooled to 5° C. The solid was collected, washed with water, and dried; the yield was 3.3 gm. (M.P. 89–93° C.). Three recrystallizations from concentrated nitric acid gave white plates (M.P. 142–144° C., I.S.=25 cm./2 kg.).

*Analysis.*—Calc'd. for $C_8H_{10}N_8O_{14}$: Percent C, 21.73; percent H, 2.28; percent N, 25.34. Found: Percent C, 21.33; percent H, 2.29; percent N, 24.52.

The explosive properties of the compounds prepared in the above examples are listed below in the Table.

TABLE

|  | M.P., °C. | I.S., cm./2 kg. | Lead Block Value | Ballistic Mortar Value |
|---|---|---|---|---|
| N-(2,2,2-Trinitroethyl)-3,3,5,5-tetranitropiperidine | 163–168 | 20 | 170 | 153 |
| N-(3,3,3-Trinitropropyl)-3,3,5,5-tetranitropiperidine | 142–144 | 25 | 154.5 | 151.5 |
| TNT (Trinitrotoluene) | 81–82 |  | 100 | 100 |

A wide variety of nitroalkylpiperidine compounds can be prepared according to my invention by proceeding in the manner set forth above and by reacting appropriate starting materials. For example, N-(3,3-dinitropentyl)-3,3,5,5-tetranitropiperidine is prepared by reacting 1-amino-3,3-dinitropentane with 2,2,4,4-tetranitro-1,5-pentanediol; N-2,2,4,4-tetranitrobutyl)-3,3,5,5-tetranitropiperidine is prepared by reacting 2,2,4,4-tetranitro-1-butanol with 3,3,5,5-tetranitropiperidine or by reacting 1-amino-2,2,4,4-tetranitrobutane with 2,2,4,4-tetranitro-1,5-pentanediol; N-(2,2,4,4-tetranitropentyl)-3,3,5,5-tetranitropiperidine is prepared by reacting 2,2,4,4-tetranitro-1-pentanol with 3,3,5,5-tetranitropiperidine or by reacting 1-amino-2,2,4,4-tetranitropentane with 2,2,4,4-tetranitro-1,5-pentanediol; N-(2,2,4-trinitropentyl)-3,3,5,5-tetranitropiperidine is prepared by reacting 2,2,4-trinitro-1-pentanol with 3,3,5,5-tetranitropiperidine or by reacting 1-amino-2,2,4-trinitropentane with 2,2,4,4-tetranitro-1,5-pentanediol; N-(3,3-dinitropropyl)-3,3,5,5-tetranitropiperidine is prepared by reacting 1-amino-3,3-ditropropane with 2,2,4,4-tetranitro-1,5-pentanediol; and N-(1-methyl-3,3-dinitrobutyl)-3,3,5,5-tetranitropiperidine is prepared by reacting 4,4-dinitro-2-pentanol with 3,3,5,5-tetranitropiperidine or by reacting 2-amino-4,4-dinitropentane with 2,2,4,4-tetranitro-1,5-pentanediol.

It will be appreciated that both higher and lower homologues of these compounds can be prepared in the identical manner without departing from the scope of my invention. All of these materials are useful as high explosives, as hereinbefore disclosed.

2,2,4,4-tetranitro-1,5-pentanediol used as a starting material in the amine condensation process of my invention is prepared according to the method disclosed in assignee's patent application Serial No. 371,150, filed July 29, 1953, and now abandoned. Tetranitropiperidine used as the starting material in the nitro alcohol condensation according to my invention is prepared by the method disclosed in my application Serial No. 392,473, filed November 16, 1953, and now abandoned. The nitro alcohols used in the alcohol-piperidine condensation reaction are prepared according to the methods disclosed in assignee's applications Serial Nos. 242,437, 371,149, 392,471, and 397,018, filed August 17, 1951; July 29, 1953, November 16, 1953, and December 8, 1953, respectively. Applications Serial Nos. 371,149 and 392,471 are now abandoned.

The nitroamine salts useful in the alternative synthesis of my invention are prepared according to the method of my United States patent application Serial No. 408,607, filed February 5, 1954, and now abandoned.

I claim:

1. As new compositions of matter, the nitroalkyl tetranitropiperidine compounds having the general formula:

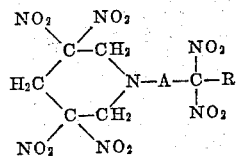

wherein A is a lower alkylene radical and R is a radical selected from the group consisting of lower nitroalkyl, lower alkyl, nitro and hydrogen radicals.

2. As new compositions of matter, the nitroalkyl tetranitropiperidine compounds having the general formula:

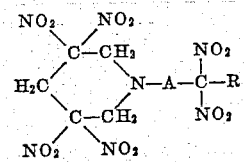

wherein R is a lower nitroalkyl radical and A is a lower alkylene radical.

3. As new compositions of matter, the nitroalkyl tetranitropiperidine compounds having the general formula:

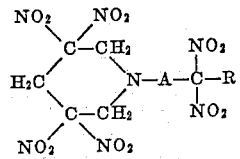

wherein A is a lower alkylene radical and R is a lower alkyl radical.

4. As new compositions of matter, the nitroalkyl tetranitropiperidine compounds having the general formula:

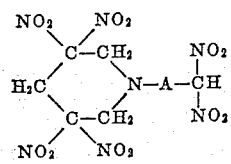

wherein A is a lower alkylene radical.

5. As new compositions of matter, the nitroalkyl tetranitropiperidine compounds having the general formula:

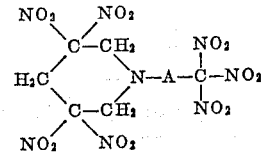

wherein A is a lower alkylene radical.

6. As a new composition of matter, N-(2,2,2-trinitroethyl)-3,3,5,5-tetranitropiperidine having the structural formula:

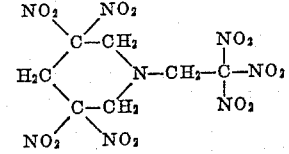

7. As a new composition of matter, N-(3,3,3-trinitropropyl)-3,3,5,5-tetranitropiperidine having the structural formula:

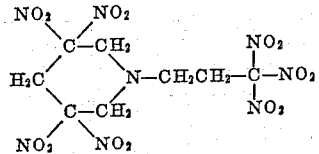

8. As a new composition of matter, N-(3,3-dinitropropyl)-3,3,5,5-tetranitropiperidine having the structural formula:

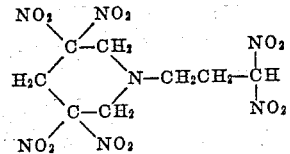

9. As a new composition of matter, N-(2,2,4-trinitropentyl)-3,3,5,5-tetranitropiperidine having the structural formula:

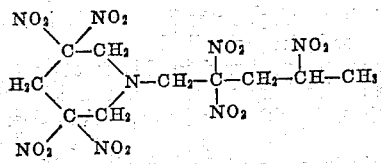

10. As a new composition of matter, N-(2,2,4,4-tetranitropentyl)-3,3,5,5-tetranitropiperidine having the structural formula:

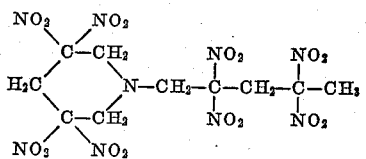

11. As a new composition of matter, N-(2,2,4,4-tetranitrobutyl)-3,3,5,5-tetranitropiperidine having the structural formula:

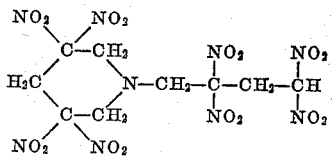

12. As a new composition of matter, N-(3,3-dinitropentyl)-3,3,5,5-tetranitropiperidine having the structural formula:

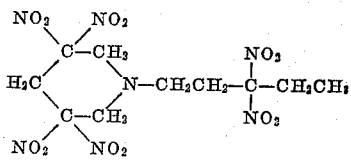

13. The method of preparing N-nitroalkyl tetranitropiperidine compounds having the general formula:

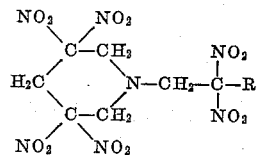

wherein R is a radical selected from the group consisting of lower nitroalkyl, lower alkyl, nitro and hydrogen radicals, which comprises condensing 3,3,5,5-tetranitropiperidine with a nitro alcohol having the general formula:

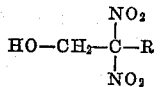

wherein R is as defined above.

14. The method of preparing N-nitroalkyl tetranitropiperidine compounds having the general formula:

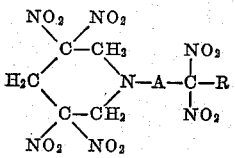

wherein A is a lower alkylene radical and R is a radical selected from the group consisting of lower nitroalkyl, lower alkyl, nitro and hydrogen radicals, which comprises condensing 2,2,4,4-tetranitro-1,5-pentanediol with a nitroalkyl amine having the general formula:

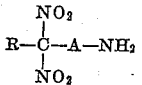

wherein A and R are as defined above.

15. The method of claim 14 wherein said amine is generated in situ.

16. The method of preparing N-(2,2,2-trinitroethyl)-3,3,5,5-tetranitropiperidine which comprises condensing 3,3,5,5-tetranitropiperidine with 2,2,2-trinitroethanol.

17. The method of preparing N-(3,3,3-trinitropropyl)-3,3,5,5-tetranitropiperidine which comprises condensing 2,2,4,4 - tetranitrol - 1,5 - pentanediol with 3,3,3 - trinitropropyl amine.

No references cited.